(12) United States Patent
Kikukawa et al.

(10) Patent No.: US 7,944,802 B2
(45) Date of Patent: May 17, 2011

(54) SUPER-RESOLUTION OPTICAL RECORDING MEDIUM AND METHOD FOR RECORDING INFORMATION ON SUPER-RESOLUTION OPTICAL RECORDING MEDIUM

(75) Inventors: Takashi Kikukawa, Tokyo (JP); Narutoshi Fukuzawa, Tokyo (JP); Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 764 days.

(21) Appl. No.: 11/541,546

(22) Filed: Oct. 3, 2006

(65) Prior Publication Data

US 2007/0081443 A1 Apr. 12, 2007

(30) Foreign Application Priority Data

Oct. 7, 2005 (JP) .................. 2005-294387

(51) Int. Cl.
 G11B 9/00 (2006.01)
 G11B 3/70 (2006.01)
 G11B 5/84 (2006.01)
 G11B 7/26 (2006.01)
 G11B 7/24 (2006.01)
(52) U.S. Cl. .............. 369/126; 369/275.4; 369/272.1
(58) Field of Classification Search .......... 369/126
See application file for complete search history.

(56) References Cited

U.S. PATENT DOCUMENTS 5,625,388 A * 4/1997 Maeda et al. ............ 346/135.1
5,699,342 A * 12/1997 Yagi et al. ................ 369/47.5
2005/0117478 A1* 6/2005 Kuwahara et al. ....... 369/47.53
2005/0259564 A1* 11/2005 Ahn et al. ................ 369/283
2006/0250916 A1* 11/2006 Kikukawa et al. ........ 369/59.11

FOREIGN PATENT DOCUMENTS

| JP | A 2003-6872 | 1/2003 |
| JP | A-2006-216220 | 8/2006 |
| JP | A-2006-252712 | 9/2006 |

OTHER PUBLICATIONS

Kikukawa et al; "Scanning Probe Microscope Observation of Recorded Marks in Phase Change Disks;" Microscopy and Microanalysis 7; 2001; pp. 363-367.*

T. Kikukawa et al., "Rigid Bubble Pit Formation and Huge Signal Enhancement in Super-Resolution Near-Field Structure Disk With Platinum-Oxide Layer," Applied Physics Letters, vol. 81, No. 25, pp. 4697-4699, Dec. 16, 2002.

* cited by examiner

*Primary Examiner* — Joseph Haley
*Assistant Examiner* — Nicholas Lee
(74) *Attorney, Agent, or Firm* — Oliff & Berridge, PLC

(57) ABSTRACT

A super-resolution optical recording medium has at least a recording layer and a super resolution layer on a substrate. In the recording layer, a minimum recording mark is formed with spaces within a beam spot of a laser beam in recording. The minimum recording mark has a size of a resolution limit of a reproduction optical system or less, and can be reproduced by the reproduction optical system due to the existence of the super solution layer. The minimum recording mark in an AFM image takes the shape of a convex arc on a leading edge thereof and the shape of a concave arc on a trailing edge thereof (the AFM image is a plan view which can be observed on a surface when the light transmission layer is removed), and spaces have the similar shape to these.

18 Claims, 6 Drawing Sheets

SUPER-RESOLUTION OPTICAL RECORDING MEDIUM AND METHOD FOR RECORDING INFORMATION ON SUPER-RESOLUTION OPTICAL RECORDING MEDIUM

BACKGROUND OF THE INVENTION

1. Field of the Invention

The present invention relates to a super-resolution optical recording medium which can reproduce information by irradiating reproduction light on recording marks formed on a recording layer. In particular, the present invention relates to the super-resolution optical recording medium from which small recording marks the size of which is equal to, or less than, the resolution limit of a reproduction optical system can be reproduced, and a method for recording information on the super-resolution optical recording medium.

2. Description of the Related Art

In recent years, as described in, for example, Japanese Patent Laid-Open Publication No. 2003-6872, a super-resolution optical recording medium has been proposed, from which a recording mark train smaller than the diffraction limit of a reproduction optical system can be reproduced.

In the case of a conventional optical recording medium, in general, it is impossible to read a recording mark row the period of which is a certain recording mark row period or less by a reproduction method using light. The length of this recording mark row period is referred to as a diffraction limit. In a reproduction optical system with a wavelength of $\lambda$ and a numerical aperture of NA, the diffraction limit is represented as $\lambda/NA/2$. If the length of a recording mark is equal to that of a blank in one period, the length of the recording mark is represented as $\lambda/NA/4$. The length of the recording mark is referred to as a resolution limit.

Thus, reducing the wavelength $\lambda$ and/or increasing the numerical aperture NA reduces the resolution limit, and hence increases recording density. Further shortening the wavelength and increasing the numerical aperture are reaching their limits. The foregoing super-resolution optical recording medium adopts technologies for reproducing recording marks smaller than $\lambda/NA/4$ to further increase the recording density without shortening the wavelength $\lambda$ and increasing the numerical aperture NA.

The above-described conventional optical recording medium includes a phase-change recording film, as described in, for example, Scanning Probe Microscope Observation of Recorded Masks in Phase Change Disks: Takashi Kikukawa and Hajime Utsunomiya, Microsc. Microanal., 7 (2001)363-367. Therefore, the recording mark or the vicinity thereof is not deformed by the recording operation.

SUMMARY OF THE INVENTION

In view of the foregoing problems, various exemplary embodiments of this invention provide a super-resolution optical recording medium which can further increase its recording density and a method for recording information on the super-resolution optical recording medium.

As a result of diligent study, the inventor found that in a super-resolution optical recording medium, recording marks are formed in such a manner that at least a minimum recording mark in a modulation signal in an AFM (atomic force microscope) image (the image can be observed on a surface when a light transmission layer is removed) in a plan view takes the shape of a convex arc on the leading edge and the shape of a concave arc on the trailing edge, and this makes it possible to record information at a high CNR (carrier to noise ratio).

In summary, the above-described objectives are achieved by the following embodiments of the present invention.

(1) A super-resolution optical recording medium comprising a substrate and a recording layer formed on the substrate, wherein recording marks which have a size of a resolution limit of a reproduction optical system or less and can be reproduced by the reproduction optical system are formed in the recording layer as a deformation in the thickness direction caused by volume change of the recording layer, and wherein at least a minimum recording mark of the recording marks in a modulation code in an AFM (atomic force microscope) image of takes the shape of a convex arc on a leading edge thereof and the shape of a concave arc on a trailing edge thereof, the AFM image being a plan view which can be observed on a surface when deformed parts by volume change in the recording layer is substantially exposed to the environment.

(2) A super-resolution optical recording medium comprising a substrate, a recording layer and a light transmission layer formed on the substrate, wherein recording marks which have a size of a resolution limit of a reproduction optical system or less and can be reproduced by the reproduction optical system are formed in the recording layer, and wherein at least a minimum recording mark of the recording marks in a modulation signal in an AFM (atomic force microscope) image of takes the shape of a convex arc on a leading edge thereof and the shape of a concave arc on a trailing edge thereof, the AFM image being a plan view which can be observed on a surface when the light transmission layer is removed.

(3) The super-resolution optical recording medium according to (1), wherein spaces are formed in front and behind of the minimum mark in the AFM image, and a front end of the space takes the shape of a convex arc and a rear end of the space takes the shape of a concave arc.

(4) The super-resolution optical recording medium according to (2), wherein spaces are formed in front and behind of the minimum mark in the AFM image, and a front end of the space takes the shape of a convex arc and a rear end of the space takes the shape of a concave arc.

(5) An information recording method for forming recording marks in a recording layer of a super-resolution optical recording medium, the super-resolution optical recording medium having at least a substrate, and the recording layer, a super-resolution layer, and a light transmission layer which are formed on the substrate, the recording mark having a size of a resolution limit of a reproduction optical system or less and being reproduced by the reproduction optical system, the method comprising: forming at least a minimum mark of the recording marks in a modulation signal in such a manner that the minimum recording mark in an AFM (atomic force microscope) image takes the shape of a convex arc on a leading edge thereof and the shape of a concave arc on a trailing edge thereof, the AFM image being a plan view which can be observed on a surface when the light transmission layer is removed.

(6) The information recording method according to (5), wherein spaces are formed in front and behind of the minimum mark in the AFM image, and a front end of the space takes the shape of a convex arc and a rear end of the space takes the shape of a concave arc.

According to the present invention, the leading edge of at least the minimum mark of the recording marks in the modulation signal takes the shape of a convex arc and the trailing edge thereof takes the shape of a concave arc in the AFM image in a plan view. Therefore, it is possible to further improve recording density while maintaining a high CNR.

DETAILED DESCRIPTION OF THE PREFERRED EMBODIMENTS

A super-resolution optical recording medium according to the best mode has a substrate and at least a recording layer and a super resolution layer which are formed on the substrate. In the recording layer, recording marks are formed. The recording marks are of the size of at least the resolution limit of a reproduction optical system or less, and can be reproduced in the reproduction optical system due to the existence of the super resolution layer. The marks and spaces having one or a plurality of lengths are formed in this super-resolution optical recording medium in accordance with a suitable modulation method. Of the recording marks, a minimum mark has such a shape that a leading edge thereof takes the shape of a convex arc and a trailing edge thereof takes the shape of a concave arc in an AFM image in a plan view on a surface which appears when a light transmission layer is removed. Spaces are also formed in front and behind of the minimum mark in the AFM image in such a manner that a front end thereof takes the shape of a convex arc and a rear end thereof takes the shape of a concave arc. In this instance, the light transmission layer may be removed physically or by using a solvent for dissolving the light transmission layer.

It is possible to judge the leading edge and the trailing edge of the recording mark by the incident direction of recording laser power, the rotation direction of the medium in recording, the fixed direction of the medium when being observed by AFM, the scan direction of a probe of the AFM, or recording and observing a signal with the arrangement of specific mark length and space length enough to judge the leading edge and the trailing edge.

[First Exemplary Embodiment]

A first exemplary embodiment of the present invention will be hereinafter described in detail with reference to FIGS. 1 to 3C.

Figure 1:
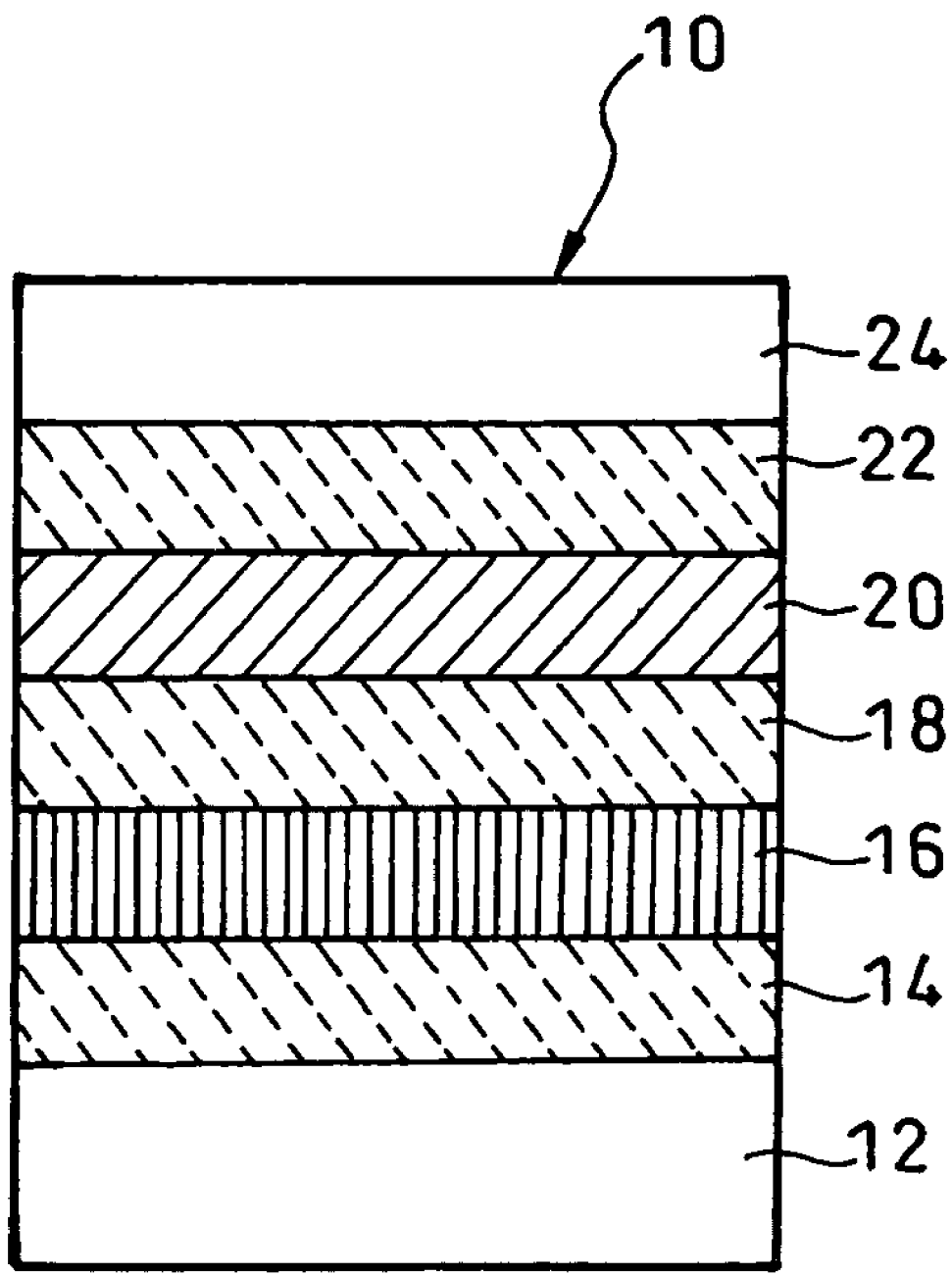
FIG. 1 is a sectional view schematically showing a super-resolution optical recording medium according to an exemplary embodiment of the present invention.

As shown in FIG. 1, a super-resolution optical recording medium 10 according to the first exemplary embodiment of the present invention is configured to include a first dielectric layer 14, a recording layer 16, a second dielectric layer 18, a super resolution layer 20, a third dielectric layer 22, and a light transmission layer 24, these layers being laminated in this order on a substrate 12.

The substrate 12 is made of, for example, polycarbonate. The first dielectric layer 14, the second dielectric layer 18, and the third dielectric layer 22 are made of semiconductor, oxide or sulfide of metal, or the like such as $ZnS$—$SiO_2$, $ZnS$, and $ZnO$.

The recording layer 16 is made of a material such as $PtOx$ in which part irradiated by a recording laser beam is changed in volume (deformation in the thickness direction) and an optical constant as a result of pyrolysis into platinum and oxygen, but the material is not limited to $PtOx$. Another material is available as long as at least its volume changes (deformation in the thickness direction) by irradiating the recording laser beam and a recording mark formed in the recording layer 16 does not disappear when a reproduction laser beam is irradiated on the super resolution layer 20.

The super resolution layer 20 is made of a material with super resolution with which the recording mark having a length of 1/4NA or less can be reproduced. The super resolution layer is made of one of materials including any element of Sb, Bi, and Te and any compound of Sb, Bi, Te, Zn, Sn, Ge, and Si, for example, any compound containing any of the foregoing elements such as Sb—Zn, Te—Ge, Sb—Te, Sb—Bi, Bi—Te, and Sb—Bi—Te.

Another material is available as long as the material is opaque to the wavelength of the reproduction laser beam and has low thermal conductivity.

Furthermore, the material of the super resolution layer 20 may contain at least one of Ag and In in addition to the foregoing materials.

In reality, the first, second, and third dielectric layers 14, 18, and 22 formed on the substrate 12 are made of, for example, $(ZnS)_{85}(SiO_2)_{15}$, the recording layer 16 is made of $PtOx$, and the super resolution layer 20 is made of $Sb_{75}Te_{25}$, to thereby configure the super-resolution optical recording medium 10.

Figure 2:
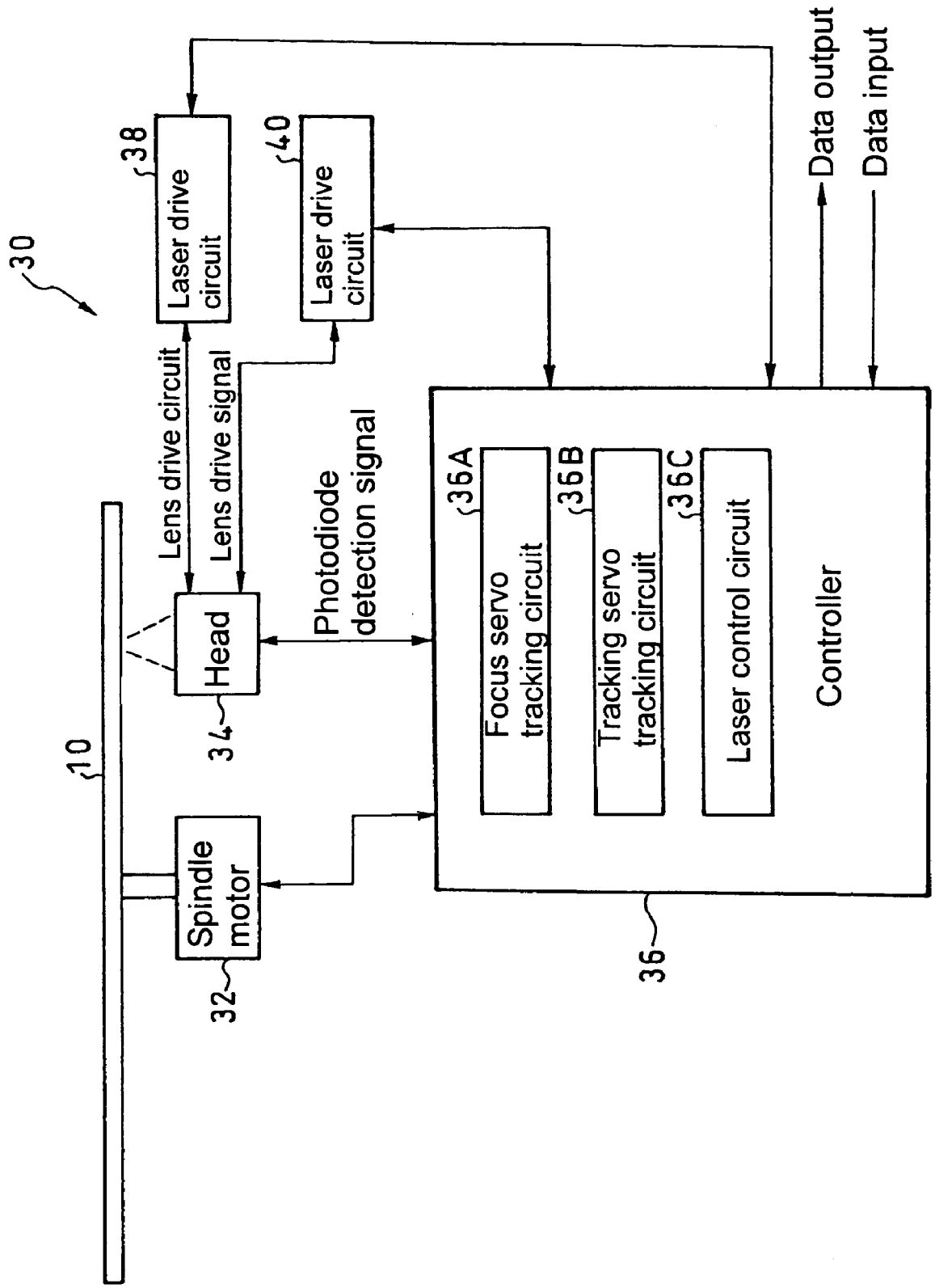
FIG. 2 is a block diagram of an information recording and reproducing apparatus for recording information on and reproducing it from the super-resolution optical recording medium.

An information recording/reproduction apparatus 30 as shown in FIG. 2 records and reproduces information on and from the super-resolution optical recording medium 10 having the foregoing structure.

The information recording/reproduction apparatus 30 is configured to include a spindle motor 32 for rotating the super-resolution optical recording medium 10, a head 34 for irradiating a laser beam on the optical recording medium 10, a controller 36 for controlling the head 34 and the spindle motor 32, a laser drive circuit 38 for providing a laser drive signal which controls the modulation of the laser beam from the head 34 into a pulse row, and a lens drive circuit 40 for providing the head 34 with a lens drive signal.

The controller 36 includes a focus servo tracking circuit 36A, a tracking servo tracking circuit 36B, and a laser control circuit 36C.

The laser control circuit 36C generates the laser drive signal provided by the laser drive circuit 38. The laser control circuit 36C appropriately generates the laser drive signal based on the recording condition configuration information recorded on the target super-resolution optical recording medium during recording data, and generates the laser drive signal so that the laser beam has a predetermined power in accordance with a kind of the target optical recording medium during reproducing data.

Using such an information recording/reproduction apparatus 30, recording marks were continuously formed in the recording layer 14 while varying write power at three steps (FIG. 3A shows the case of maximum power and FIG. 3C shows the case of minimum power). The thus formed recording marks 26, in a state that the light transmission layer 22 had been removed, were observed from above by an AFM. As shown in each of FIGS. 3A to 3C, an AFM image in a plan view appeared on a surface was observed including such a shape that a leading edge of the recording mark 26 took the shape of a convex arc 26A and a trailing edge thereof took the shape of a concave arc 26B.

Since the AFM image shows an image on which a concavo-convex pattern on the surface is reflected, the image shows that the recording marks are formed by the occurrence of deformation due to recording in the super-resolution optical recording medium and a recording method according to this exemplary embodiment. The image also reveals that these recording marks are apparently different from those in the case of a conventional phase-change type medium described in Japanese Patent Laid-Open Publication No. 2003-6872 in which the deformation does not occur by recording.

Figure 3:
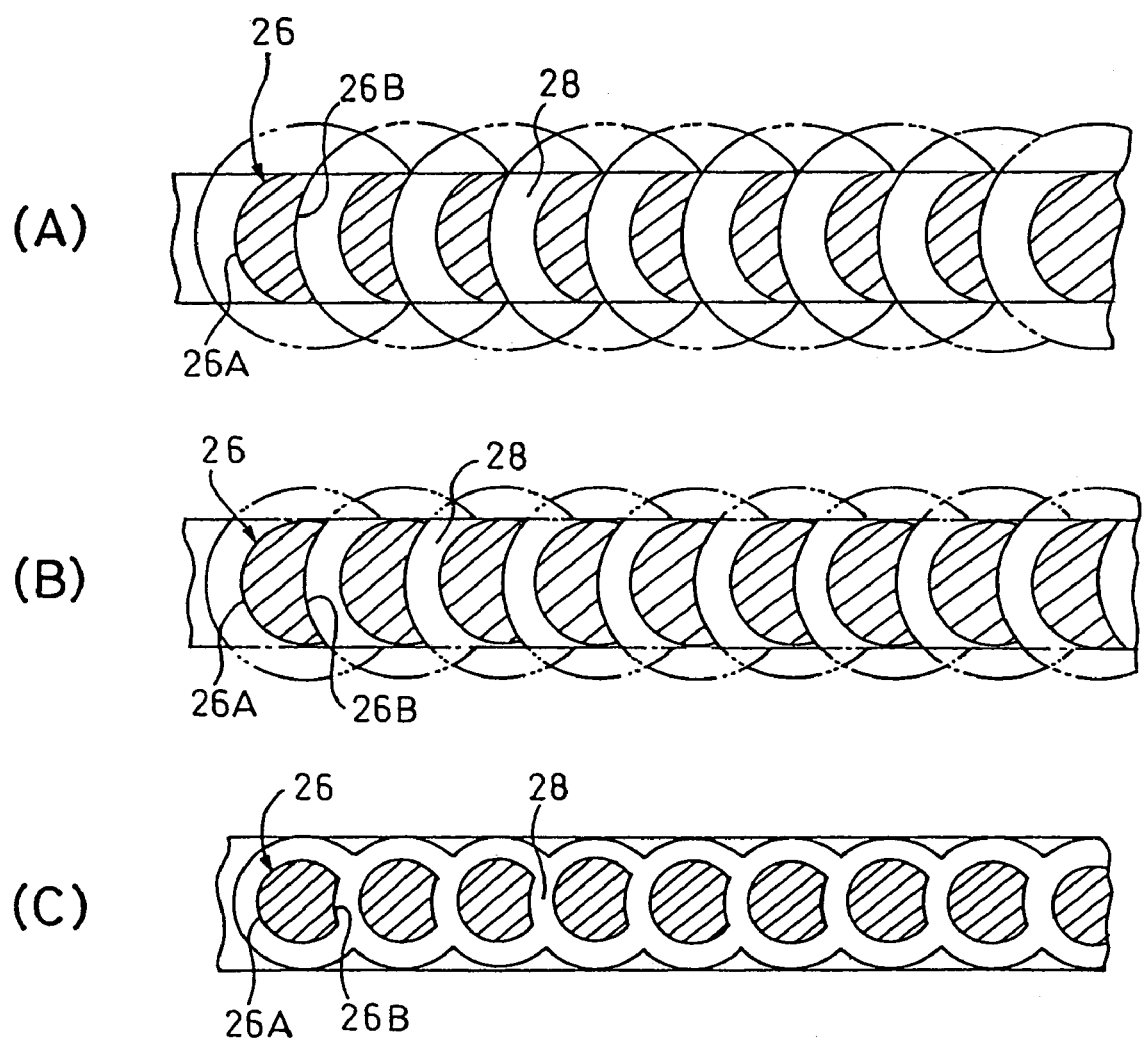
FIGS. 3A to 3C are plan views each of which schematically shows a minimum recording mark formed on a recording layer of the super-resolution optical recording medium.

The reason why the leading edge of the recording mark 26 takes the shape of a convex arc and the trailing edge thereof takes the shape of a concave arc is not definitely clear. The recording laser beam is irradiated so that part of a beam spot thereof successively overlaps in a relative moving direction to the recording layer 16 (right in FIG. 3). Thus, it is conceivable that, when the next beam spot overlaps with a rear part of a round deformed section which is previously recorded and deformed by the beam spot, this overlapped section fills deformation, and hence the recording marks 26 having the shape of FIG. 3 are formed.

An oxbow-shaped space 28, in which a front end has the shape of a convex arc and a rear end has the shape of a concave arc as in the case of the recording mark 26, is formed between the recording marks 26.

FIGS. 3A to 3C show a case where the super-resolution marks of 75 nm (<λ/NA/4) are successively formed with the use of an optical system of λ=405 nm and NA=0.85, but the present invention is not limited to this. The super-resolution optical recording medium 10 may have the recording marks of 75 nm or more as a matter of course. Taking a case of a (1, 7) modulation signal, for example, when 2T=75 nm, the same medium has the recording marks and spaces with seven kinds of different lengths of 2T (=75 nm), 3T (=113 nm), . . . , 8T (=300nm).

The recording marks 26 and spaces 28 in the shapes of FIGS. 3A to 3C are formed only when the power of the recording laser beam is within a certain range.

EXAMPLE 1

A super-resolution optical recording medium of Example 1 includes an Ag-alloy film with a thickness of 40 nm, a third dielectric layer made of $ZnS:SiO_2=85:15$ with a thickness of 80 nm, a super resolution layer made of $Sb_{75}Te_{25}$ with a thickness of 10 nm, a second dielectric layer made of $ZnS:SiO_2=85:15$ with a thickness of 40 nm, a recording layer made of PtOx with a thickness of 4 nm, a first dielectric layer made of $ZnS:SiO_2=85:15$ with a thickness of 90 nm, and a light transmission layer with a thickness of 0.1 mm, and these layers are laminated in this order on a polycarbonate substrate.

In the medium having such a configuration, it is conceivable that the PtOx (recording layer) is decomposed into Pt and $O_2$ by recording operation to form the recording marks with the volume change (deformation in the thickness direction), and the optical change of $Sb_{75}Te_{25}$ (super resolution layer) makes the reproduction of the recording marks with the size of the resolution limit or less, in other words, super-resolution reproduction possible. It should be noted that the structure and materials of the medium, in which the recording marks with the volume change are formed to make the super-resolution reproduction possible, are not limited to above. A recording film allowing deformation recording in such a manner that theleading edge leading edge takes the shape of a convex arc and thetrailing edge trailing edge takes the shape of a concave arc and a super resolution layer allowing super resolution are appropriately adopted to achieve the object.

Figure 4:
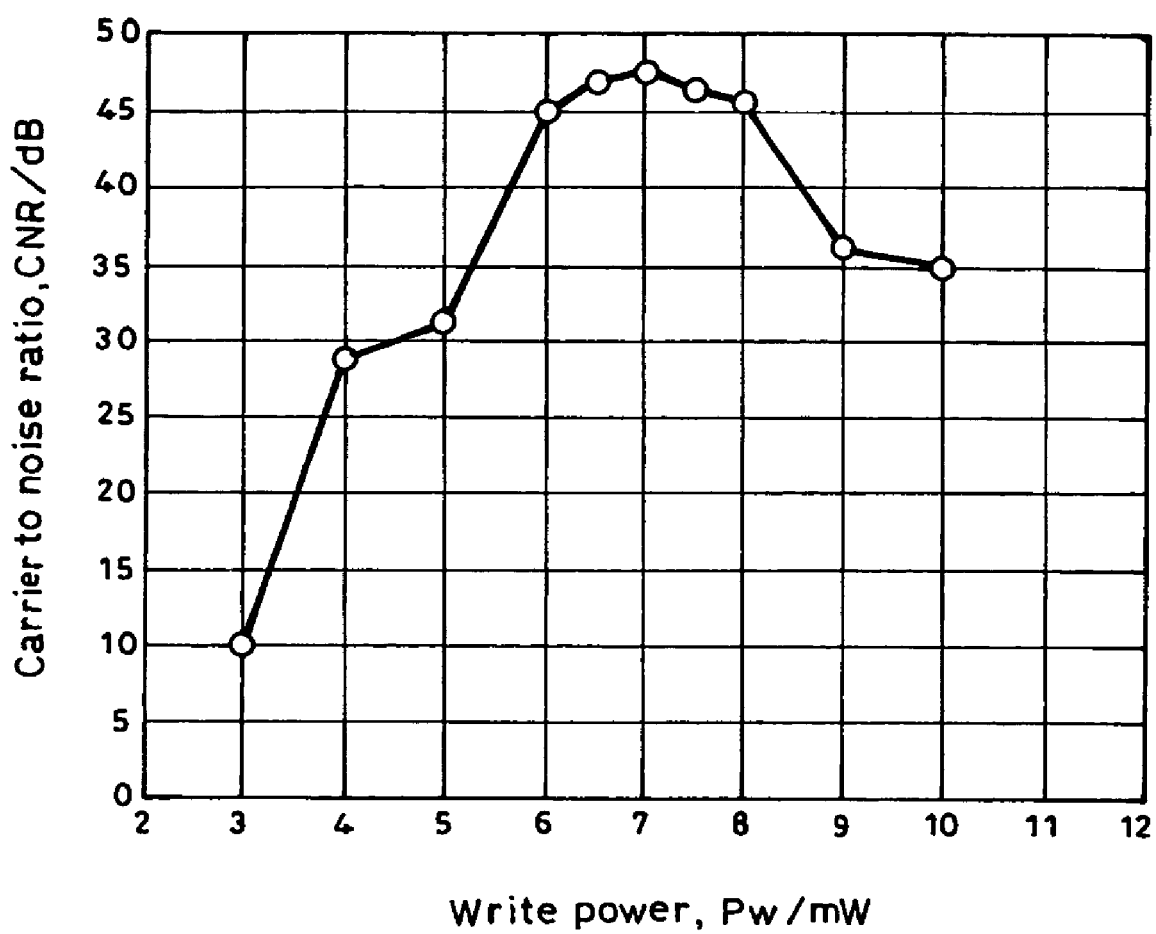
FIG. 4 is a graph showing the relation between write power and a CNR in a mark row recorded on the super-resolution optical recording medium of Example 1.

On the super-resolution optical recording medium manufactured under the foregoing conditions, the recording marks of 75 nm (the diameter of the beam spot was approximately 480 nm) were successively formed while varying the power of the recording laser beam at eight steps. Table 1 and FIG. 4 show CNR(dB) in a mark row therein.

TABLE 1

| Pw (mW) | CNR (dB) |
| --- | --- |
| 0.0 | — |
| 3.0 | 10.1 |
| 4.0 | 28.9 |
| 5.0 | 31.3 |
| 6.0 | 44.9 |
| 7.0 | 47.5 |
| 8.0 | 45.5 |
| 9.0 | 36.2 |
| 10.0 | 35.1 |

Figure 5:
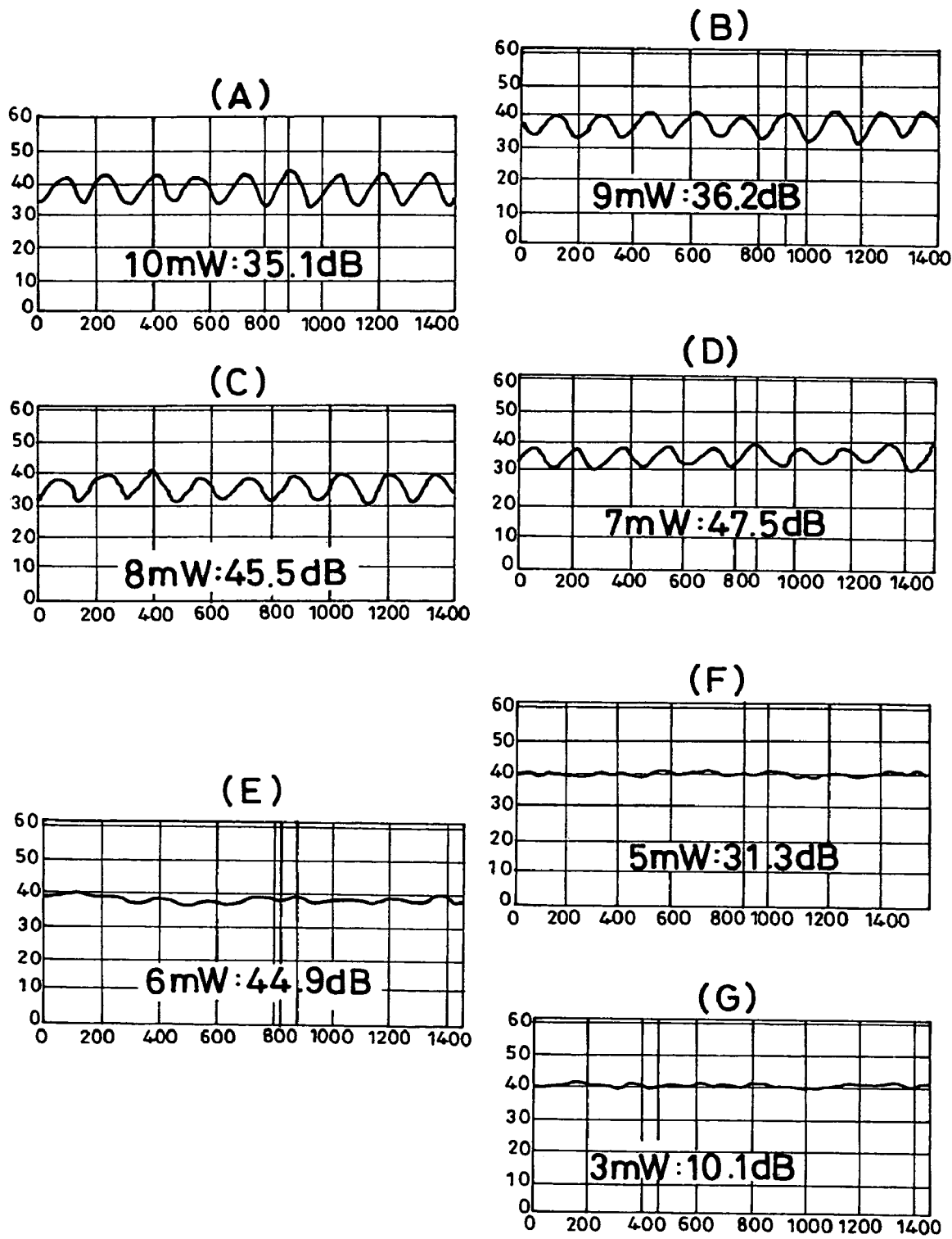
FIGS. 5A to 5G are graphs each showing a concavo-convex pattern in the cross section of the mark row.
Figure 6:
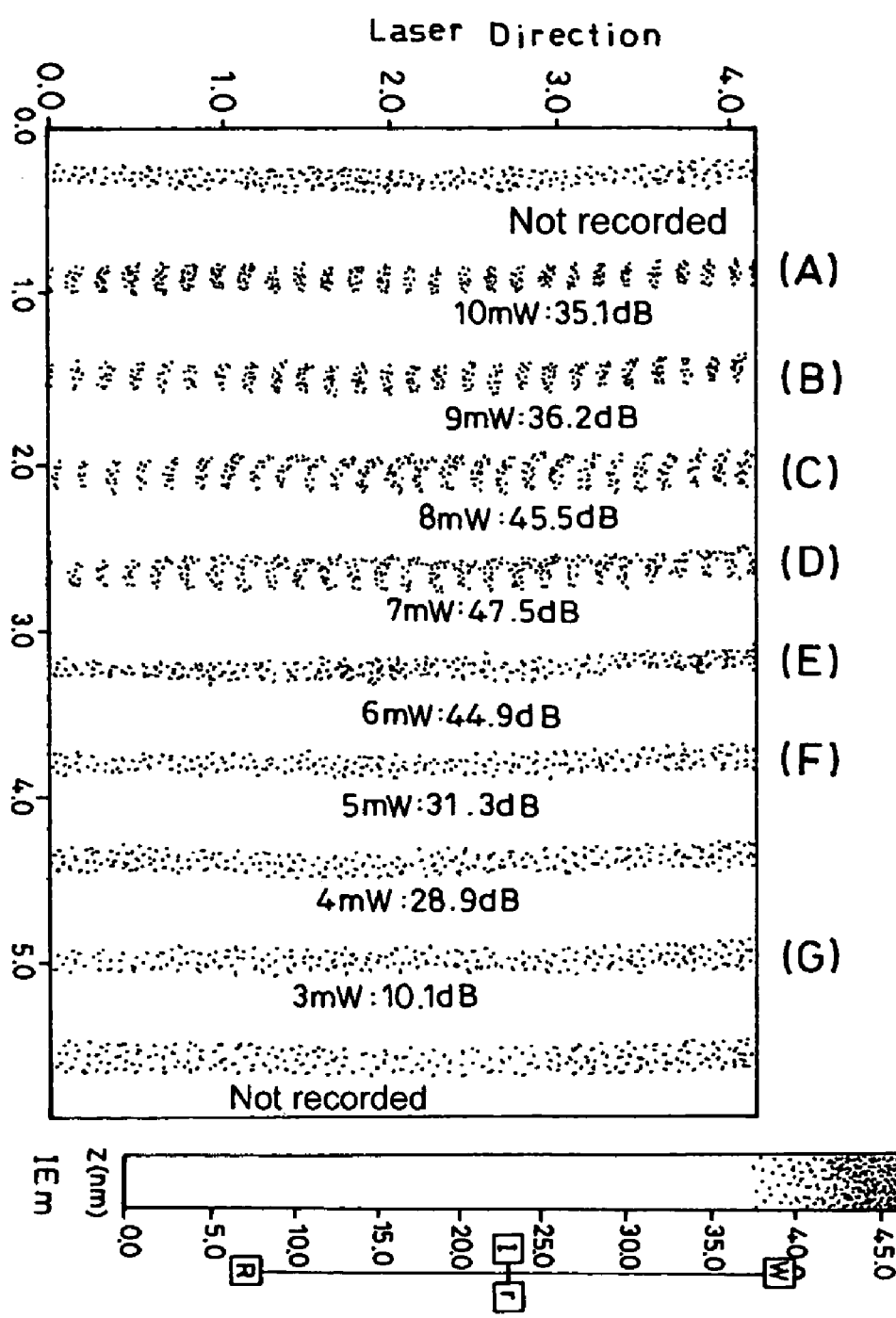
FIG. 6 is a graph showing an AFM image of the mark row in a plan view which is recorded on the super-resolution optical recording medium with varying the write power in stages.

After the recording marks were formed, the light transmission layer 22 was peeled away from the super-resolution optical recording medium 10 and the remained parts were observed by an AFM. FIG. 5 shows a concavo-convex profile viewed from a straight line passing through the centers of the recording marks obtained by AFM images.

FIGS. 6A to 6G show the AFM images of the formed recording marks of each write power in a plan view. In this example, the super-resolution optical recording medium is designed so that a convex section corresponds to the space and a concave section corresponds to the recording mark to form the recording marks.

In a concave-convex pattern, as shown in FIG. 5, an amount of deformation in the thickness direction increases as the power increases from a write power of the recording laser beam of about 6 mW, but the depth in the cross section (concavo-convex pattern) becomes saturated at a write power of about 10 mW. This is because a rear recording mark fills a front recording mark. Irradiation of the laser beam with a certain power or more digs the section of the recording mark 26 down, and the material of almost the same volume is piled up therearound so as to form the space higher than the recording mark 26.

As shown in FIGS. 6A to 6G, it is revealed that especially high CNRs (45 dB or more at 7 mW and 8 mW) are obtained when recording is carried out in such a manner that the leading edge of recording mark in the AFM image takes the shape of a convex arc and the trailing edge thereof takes the shape of a concave arc in the plan view. Therefore, the effect of the present invention is apparent. In the observation of the AFM image of FIGS. 6A to 6G, it is confirmed that a moving direction of the recording laser is from left to right in the drawing, in other words, the leading edge is on the left and the trailing edge is on the right of the drawing by adjusting the incident direction of the recording laser power, the rotational direction of the medium in recording, the fixed direction of the medium during the observation by the AFM, and the scan direction of a probe of the AFM.

EXAMPLE 2

A super-resolution optical recording medium of Example 2 includes an Ag-alloy film with a thickness of 40 nm, a third dielectric layer made of $ZnS:SiO_2=85:15$ with a thickness of 80 nm, a super resolution layer made of $Sb_{58}Te_{42}$ with a thickness of 15 nm, a second dielectric layer made of $ZnS:SiO_2=85:15$ with a thickness of 45 nm, a recording layer made of PtOx with a thickness of 4 nm, a first dielectric layer made of $ZnS:SiO_2=85:15$ with a thickness of 45 nm, and a light transmission layer with a thickness of 0.1 mm, and these layers are laminated in this order on a PC substrate. When the recording marks were successively formed with varying the write power in stages as in the case of the Example 1, the shape of the recording mark at the maximum CNR in reproduction was the almost same as that of the Example 1. Deformation was observed by the AFM when CNR>35 dB.

In the above embodiments and examples, the light transmission layer 22 was peeled away from the super-resolution optical recording medium 10 and the remained parts were observed by an AFM. However, the present invention may include cases in which the recording layer is substantially exposed to the environment so as to be capable of AFM observation the volume change (deformation in the thickness direction) in the recording layer caused by irradiating the recording laser beam. For example, the first dielectric layer may be peeled away together with the light transmission layer, or a super-resolution optical recording medium without a light transmission layer may be used for AFM observation.

What is claimed is:

1. A super-resolution optical recording medium comprising:
    a substrate, a recording layer formed on the substrate, and a light transmission layer on the recording layer, wherein
    recording marks which have a size of a resolution limit of a reproduction optical system or less and can be reproduced by the reproduction optical system are formed in the recording layer by irradiating a recording laser beam as a deformation in the thickness direction caused by volume change of the recording layer, and wherein at least a minimum recording mark of the recording marks are formed in a condition that a diameter of a beam spot of the recording laser beam is approximately 480 nm, and the recording layer and a range of a power of the recording laser beam are so as to form the minimum recording mark in a modulation signal in an AFM (atomic force microscope) image of takes the shape of a convex arc on a leading edge thereof and the shape of a concave arc on a trailing edge thereof, the AFM image being a plan view which can be observed on a surface when deform parts by volume change in the recording layer is substantially exposed to the environment when the light transmission layer is removed.

2. The super-resolution optical recording medium according to claim 1, wherein
    at least the minimum recording marks are formed in a condition that spaces are formed in front and behind of the minimum mark in the AFM image, and a front end of the space takes the shape of a convex arc and a rear end of the space takes the shape of a concave arc.

3. An information recording method for forming recording marks in a recording layer of a super-resolution optical recording medium by irradiating a recording laser beam, the super-resolution optical recording medium having at least a substrate, and the recording layer, a super-resolution layer, and a light transmission layer which are formed on the substrate, the recording mark having a size of a resolution limit of a reproduction optical system or less and being reproduced by the reproduction optical system, the method comprising:
    a step of confirming a condition that a diameter of a beam spot of the recording laser beam is approximately 480 nm, the recording layer, the super-resolution layer and a range of power of the recording laser beam are for forming at least a minimum mark of the recording marks in a modulation signal in the recording layer as a deformation in the thickness direction caused by volume change of the recording layer in such a manner that the minimum recording mark in an AFM (atomic force microscope) image takes the shape of a convex arc on a leading edge thereof and the shape of a concave arc on a trailing edge thereof, the AFM image being a plan view which can be observed on a surface when the light transmission layer is removed, and
    a step of forming recording marks by irradiating the recording laser beam in the condition confirmed in the step of confirming.

4. The information recording method according to claim 3, wherein
    the condition includes a condition that space are formed in front and behind of the minimum mark in the AFM image, and a front end of the space takes the shape of a convex arc and a rear end of the space takes the shape of a concave arc.

5. The super-resolution optical recording medium according to claim 2, wherein
    a power of the recording laser beam is at one of either 7 mW and 8 mW, and the recording marks are 75 nm and have carrier to noise ratio of 45 dB or more.

6. The information recording method according to claim 4, wherein
    the recording marks are 75 nm and have carrier to noise ratio of 45 dB or more when a power of the recording laser beam is at one of either 7 mW and 8 mW.

7. The super-resolution optical recording medium according to claim 1, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 40 nm, a super resolution layer made of $Sb_{75}Te_{25}$ with a thickness of 10 nm, a third dielectric layer made of $ZnS:SiO_2=85:15$ with a thickness of 90 nm, and the light transmission layer with a thickness of 0.1 mm, and these layers are laminated in this order on the substrate made of polycarbonate substrate.

8. The super-resolution optical recording medium according to claim 1, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 45 nm, a super resolution layer made of $Sb_{58}Te_{42}$ with a thickness of 15 nm, a third dielectric layer made of $ZnS:SiO_2=85:15$ with a thickness of 45 nm, and the light transmission layer with a thickness of 0.1 mm, and these layers are laminated in this order on the substrate which is a polycarbonate substrate.

9. The information recording method according to claim 3, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 40 nm, a super resolution layer made of $Sb_{75}Te_{25}$ with a thickness of 10 nm, a third dielectric layer made of $ZnS:SiO_2=85:15$ with a thickness of 90 nm, and the light transmission layer with a thickness of 0.1 mm, and these layers are laminated in this order on the substrate made of polycarbonate substrate.

10. The information recording method according to claim 3, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 45 nm, a super resolution layer made of $Sb_{58}Te_{42}$ with a thickness of 15 nm, a third dielectric layer made of $ZnS:SiO_2=85:15$ with a thickness of 45 nm, and the light transmission layer with a thickness of 0.1 mm, and these layers are laminated in this order on the substrate which is a polycarbonate substrate.

11. The super-resolution optical recording medium according to claim 2, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 40 nm, a super resolution layer made of $Sb_{75}T_{25}$ with a thickness of 10 nm, a third dielectric layer made of $ZnS:SiO_2=85:15$ with a thickness of 90 nm, and the light transmission layer with a thickness of 0.1 mm, and these layers are laminated in this order on the substrate made of polycarbonate substrate.

12. The super-resolution optical recording medium according to claim 2, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 45 nm, a super resolution layer made of $Sb_{58}Te_{42}$ with a thickness of 15 nm, a third dielectric layer made of $ZnS:SiO_2=85:15$ with a thickness of 45 nm, and the light transmission layer with a thickness of 0.1 mm, and these layers are laminated in this order on the substrate which is a polycarbonate substrate.

13. The super-resolution optical recording medium according to claim 5, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 40 nm, a super resolution layer made of $Sb_{75}Te_{25}$ with a thickness of 10 nm, a third dielectric layer made of $ZnS:SiO_2=85:15$ with a thickness of 90 nm, and the light transmission layer with a thickness of 0.1 mm, and these layers are laminated in this order on the substrate made of polycarbonate substrate.

14. The super-resolution optical recording medium according to claim 5, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of ZnS: $SiO_2=85:15$ with a thickness of 45 nm, a super resolution layer made of $Sb_{58}Te_{42}$ with a thickness of 15 nm, a third dielectric layer made of $ZnS:SiO_2=85:15$ with a thickness of 45 nm, and the light transmission layer with a thickness of 0.1 mm, and these layers are laminated in this order on the substrate which is a polycarbonate substrate.

15. The information recording method according to claim 4, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 40 nm, a super resolution layer made of $Sb_{75}Te_{25}$ with a thickness of 10 nm, a third dielectric layer made of $ZnS:SiO_2=85:15$ with a thickness of 90 nm, and the light transmission layer with a thickness of 0.1 mm, and these layers are laminated in this order on the substrate made of polycarbonate substrate.

16. The information recording method according to claim 4, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 45 nm, a super resolution layer made of $Sb_{58}Te_{42}$ with a thickness of 15 nm, a third dielectric layer made of $ZnS:SiO_2=85:15$ with a thickness of 45 nm, and the light transmission layer with a thickness of 0.1 mm, and these layers are laminated in this order on the substrate which is a polycarbonate substrate.

17. The information recording method according to claim 6, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 40 nm, a super resolution layer made of $Sb_{75}Te_{25}$ with a thickness of 10 nm, a third dielectric layer made of $ZnS:SiO_2=85:15$ with a thickness of 90 nm, and the light transmission layer with a thickness of 0.1 mm, and these layers are laminated in this order on the substrate made of polycarbonate substrate.

18. The information recording method according to claim 6, wherein the super-resolution optical recording medium includes an Ag-alloy film with a thickness of 40 nm, a first dielectric layer made of $ZnS:SiO_2=85:15$ with a thickness of 80 nm, the recording layer made of PtOx with a thickness of 4 nm, a second dielectric layer made of $ZnS:SiO_2=85:15$ with a thickness of 45 nm, a super resolution layer made of $Sb_{58}Te_{42}$ with a thickness of 15 nm, a third dielectric layer made of $ZnS:SiO_2=85:15$ with a thickness of 45 nm, and the light transmission layer with a thickness of 0.1 mm, and these layers are laminated in this order on the substrate which is a polycarbonate substrate.

* * * * *